Nov. 5, 1946.  F. A. WATSON  2,410,557
AUTOMOTIVE VEHICLE
Filed Aug. 23, 1943   7 Sheets-Sheet 1

Inventor
Frank A. Watson
by Tefft & Tefft
attorney

Nov. 5, 1946.  F. A. WATSON  2,410,557
AUTOMOTIVE VEHICLE
Filed Aug. 23, 1943   7 Sheets-Sheet 4

Inventor
Frank A. Watson
by Tefft & Tefft
Attorneys

Inventor
Frank A. Watson
by Tefft & Tefft
attorney

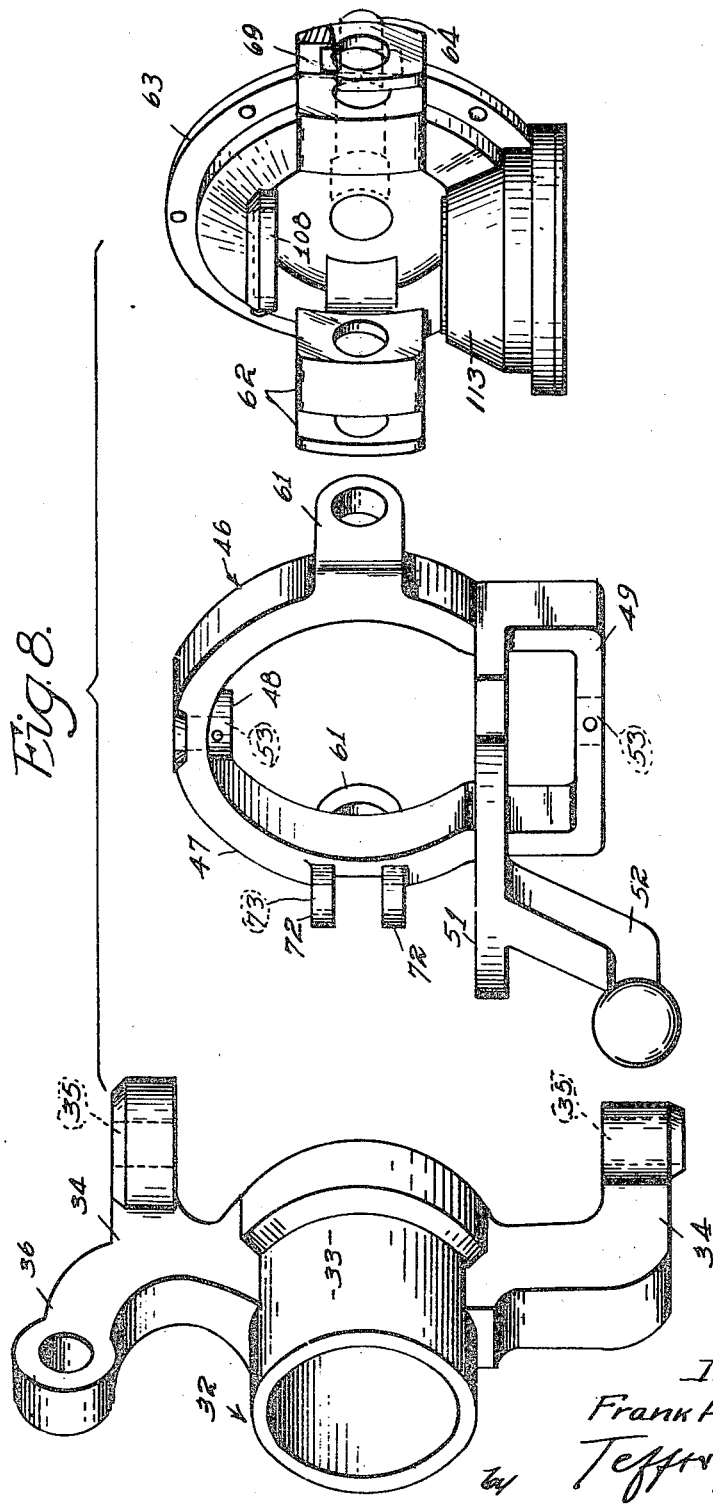

Patented Nov. 5, 1946

2,410,557

UNITED STATES PATENT OFFICE 2,410,557

AUTOMOTIVE VEHICLE

Frank A. Watson, Chicago, Ill.

Application August 23, 1943, Serial No. 499,725

9 Claims. (Cl. 180—24)

This invention relates generally to automotive vehicles and in particular to a vehicle of heavy duty type such as a truck or bus, in which a front drive axle is provided with dual wheel assemblies pivotally movable to conform to the contour of the road surface over which the vehicle is operating.

Dual wheel assemblies now commonly used are generally applied to the non-steering wheels of a vehicle and supported for rotation together. It is common practice to have dual wheel assemblies on a rear axle but in these assemblies the dual wheels are usually supported on a common hub unit and incapable of relative rotation to compensate for different sized tires being used on the dual wheels, or for one of the tires travelling a greater distance than the other tire when the vehicle is maneuvered out of a straight line path. With the wheels thus assembled their rotation together is accomplished by the slipping of one wheel relative to the road surface. This slipping is objectionable due to the fact that tire wear is accelerated by the slipping action.

By virtue of the wheels being rotatable as a unit it is apparent that these wheel assemblies are incapable of being used for steering purposes. As a result trucks and buses now in use have dual wheel assemblies only on the rear axle and single wheels on the front axle, regardless of the fact that the load may be equally distributed on both axles. The tires on the single steering wheels, therefore, are continuously subjected to an overload, or at least are always maintained near the maximum limit of their safe carrying capacity.

It is an object of this invention, therefore, to provide an improved automotive vehicle of heavy duty type.

A further object of this invention is to provide a vehicle having dual wheel assemblies throughout so that the vehicle load is equally distributed over all of the wheel tires.

A further object of this invention is to provide a dual wheel assembly for a front axle in which the wheels are pivotally movable together for steering purposes and supported for relative rotational movement.

Another object of this invention is to provide a dual front wheel drive assembly in which the dual wheels are pivotally movable together in a vertical plane to accommodate themselves to uneven road surfaces.

A still further object of this invention is to provide a brake system for a dual wheel assembly having relatively rotatable wheels, in which brake portions on each wheel are constructed and assembled for coacting and concurrent operation on the actuation of a common fluid pressure unit.

A feature of this invention is found in the provision of a dual wheel front axle drive assembly in which the vehicle engine is supported at one end directly on the front axle and rotatably supported at its opposite end on the vehicle frame to provide for its movement with the front axle.

Yet another feature of this invention is found in the provision of a dual wheel front drive assembly in which the dual wheels are supported together for pivotal movement in both horizontal and vertical planes and connected with a drive shaft by means including a differential mechanism to provide for their relative rotation.

A still further feature of this invention is found in the provision of a dual front wheel drive assembly in which the wheels are supported on a spindle pivotally movable in one direction about a vertical axis means and in a direction normal to such one direction about a horizontal axis means, with the two axis means being located substantially intermediate the dual wheels. Driven connection of the wheels with a drive shaft is accomplished by means including a differential mechanism carried on the spindle.

Further objects, features and advantages of this invention will become apparent from the following description when taken in connection with the accompanying drawings in which;

Fig. 8 is an exploded perspective view of the members in the dual front wheel drive assembly which provide for the pivotal movement of the wheels in vertical and horizontal planes.

Figure 1:
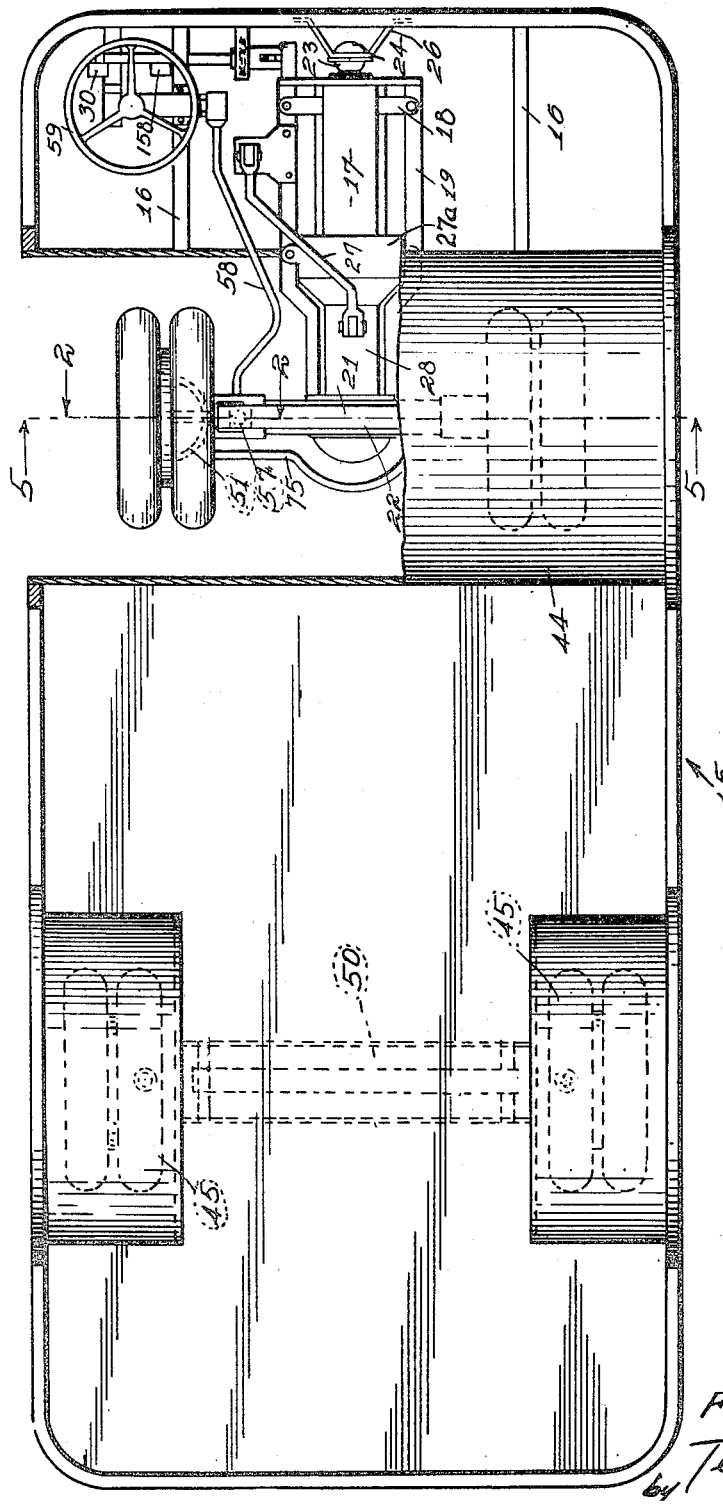
Fig. 1 is a sectional plan view of the improved vehicle of this invention with parts broken away to more clearly show the construction and relative assembly of a dual front wheel drive assembly therewith.
Figure 2:
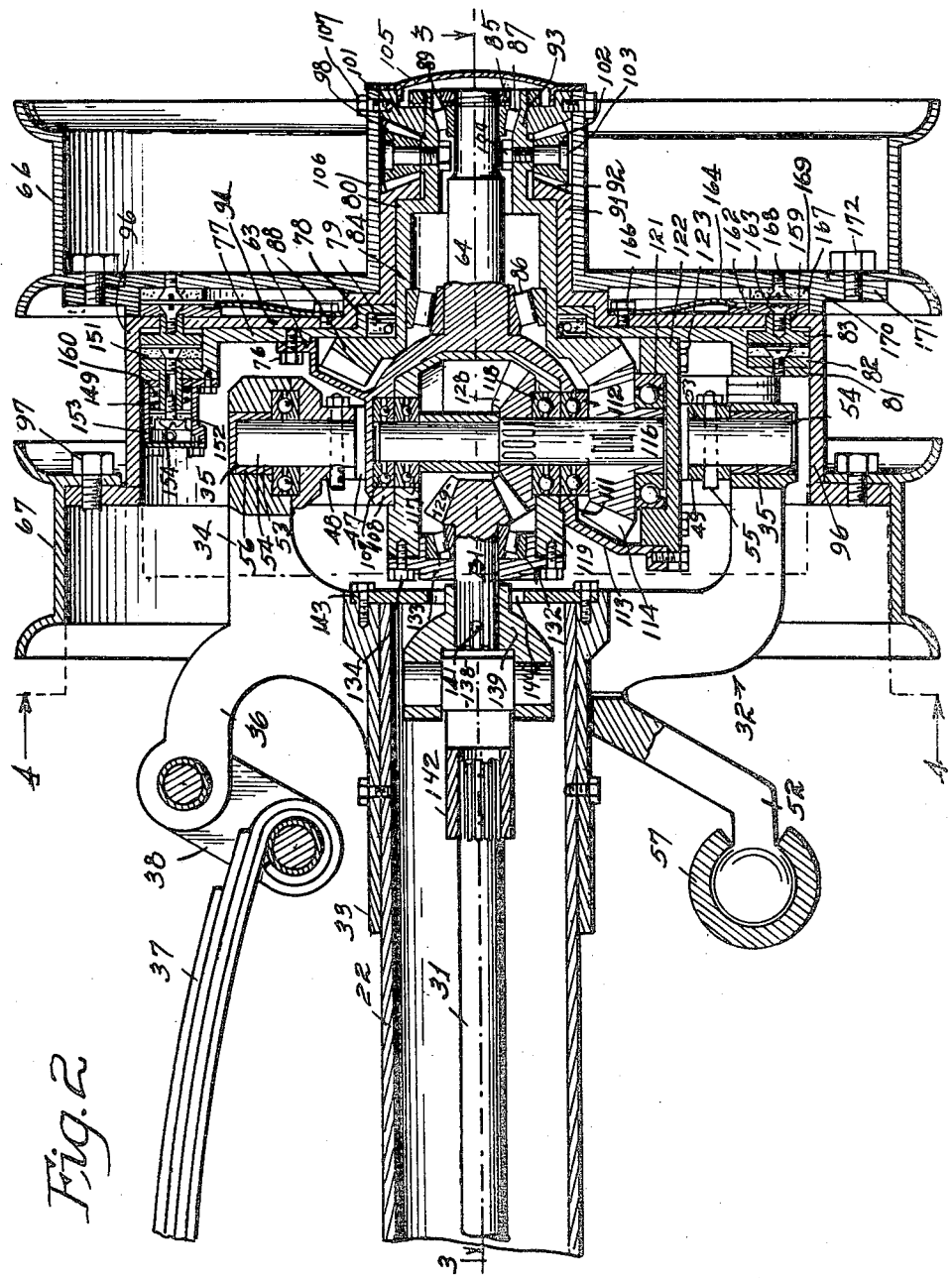
Fig. 2 is an enlarged sectional view taken on the line 2—2 in Fig. 1 showing the dual front wheel drive assembly of this invention.
Figure 5:
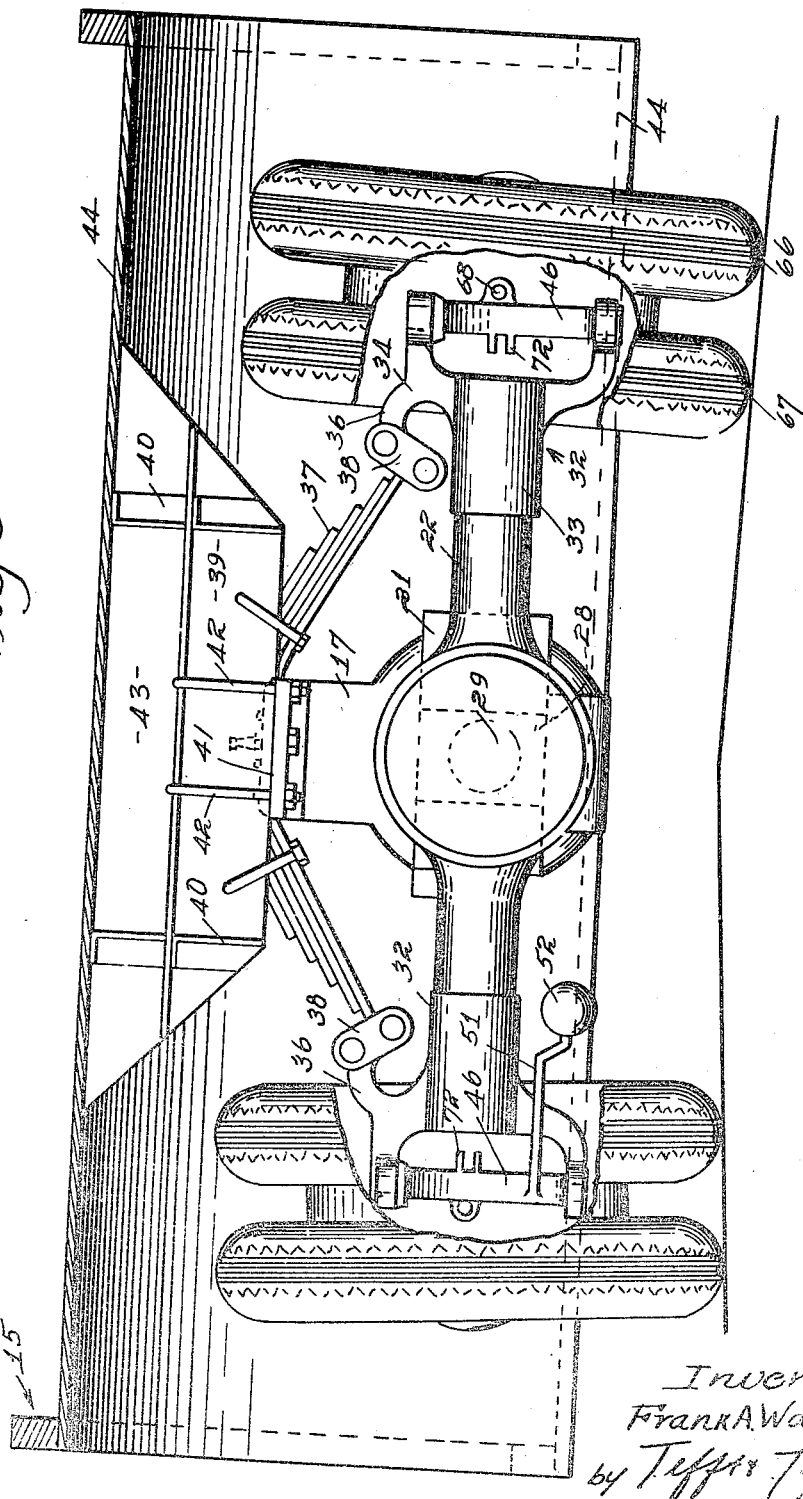
Fig. 5 is a sectional view taken on the line 5—5 in Fig. 1 with parts broken away to more clearly show the assembly relation of the dual front wheel assembly with the front axle and the support of the vehicle engine on the front axle.
Figure 6:
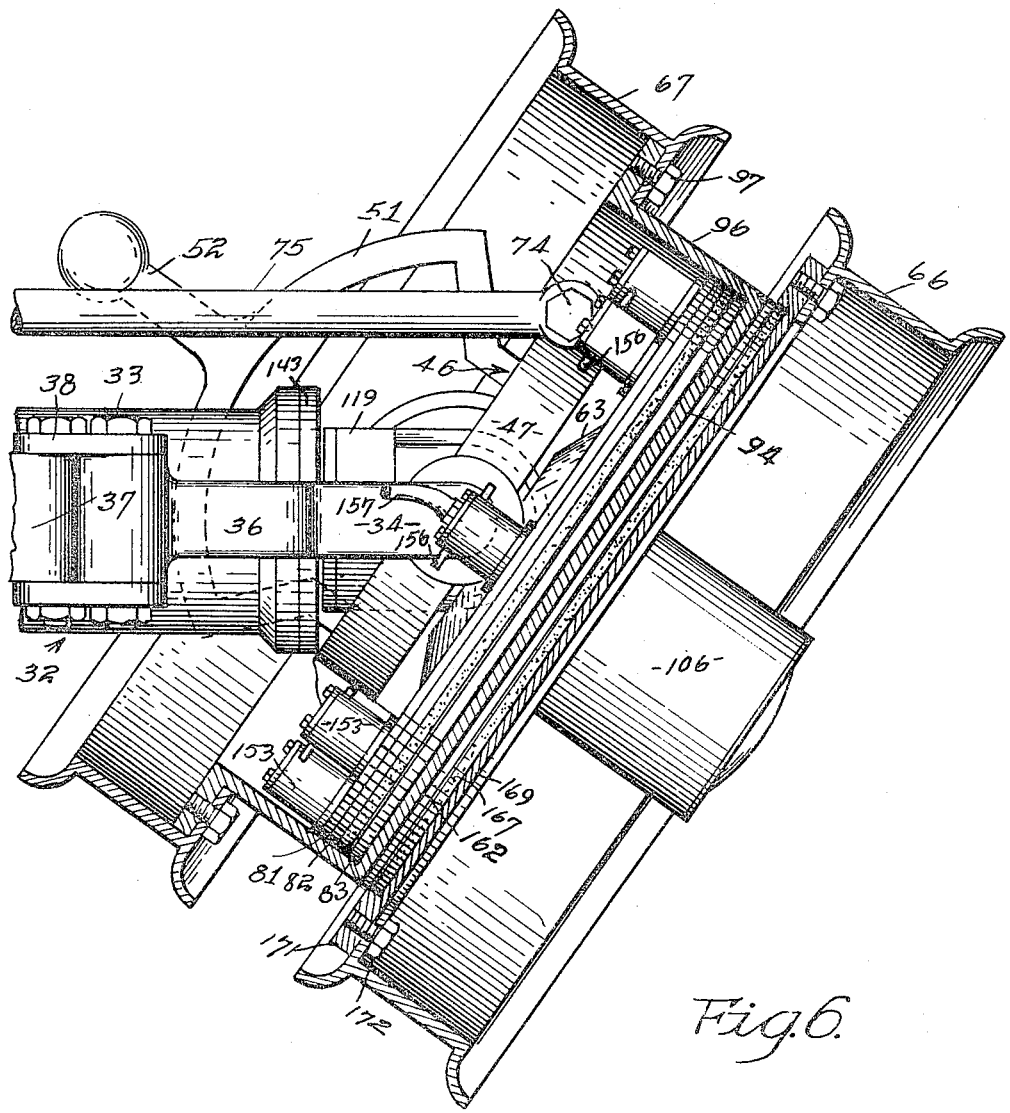
Fig. 6 is a sectional view of the front wheel assembly as seen along the line 6—6 in Fig. 4 and showing the wheels in a turning position.

Referring to the drawings the improved automotive vehicle of this invention is shown in Figs. 1, 2 and 5 as including a substantially rectangular horizontal frame or chassis 15 which extends completely about the drive and control mechanisms of the vehicle to function as a protective bumper for these parts. The chassis 15 is suitably reinforced by transverse and longitudinal frame members, only two longitudinal members 16 being illustrated in Fig. 1 for the purpose of clarity.

The vehicle engine 17 is supported on cross bars 18 carried on a sub-frame 19 which is secured at its rear end by a bracket 21 to an axle housing 22 of a usual construction. The front end of the sub-frame is rotatably mounted on the chassis 15 by a ball and socket connection including a ball 23 on the sub-frame and a corresponding socket 24 carried on a bracket 26 secured to the chassis 15. This ball and socket connection serves the dual purpose of taking the engine driving torque and of supporting the front end of the engine 17 while permitting free movement of the axle housing 22 to accommodate itself to road surface irregularities as will be later explained. A clutch operating mechanism 27 and clutch 27a together with the transmission 28 are mounted on the sub-frame 19 in driven association with the engine 17 in a usual manner, a clutch pedal being indicated at 30. The drive shaft 29 from the transmission 28 is aligned with and connected with the front axle drive shaft 31 to provide for the direct transmission of power to the drive shaft 31 without the usual propeller shaft and universal joints.

As illustrated in Fig. 1 the vehicle includes front dual wheel drive assemblies and dual rear wheel assemblies 45 associated with a rear axle 50.

Each front dual wheel drive assembly includes a steering head 32 of the so-called Elliott type (Figs. 1, 2 and 8) which comprises a tubular body member 33 positioned about and secured to the axle housing 22, and oppositely arranged goosenecks having horizontal portions or jaws 34 extended outwardly in an axial direction from the tubular body member 33. As clearly appears in Fig. 2 the jaws 34 are vertically spaced from each other with each jaw having a vertical bore 35 which are in relative coaxial alignment. The upper jaw 34 of each steering head 32 is formed with a supporting arm 36 projected inwardly over the tubular body portion 33. A leaf spring 37 is connected at each end with an arm 36 by a spring shackle 38.

The upper part of the spring 37 is received in a channel member 39 (Fig. 5) and is retained in the channel member by a supporting plate 41 and U-shaped clamping bolts 42. A second channel member 43 is secured in a superposed position on the member 39 by angle members 40. Carried on the top channel member 43 is a semi-circular frame member 44 composed of a heavy plate metal and extended transversely of the chassis 15. The end peripheral portions of the semi-circular frame member 44 are secured to corresponding semi-circular portions of the chassis 15 as is clearly illustrated in Figs. 1 and 5. The frame or plate member 44 thus serves the double function of supporting the forward end of the chassis 15 on the front axle housing 22 and of forming a housing or guard for the axle housing and the front dual wheel assemblies. Since the front wheel assemblies are similar in construction only one of them will be referred to in the following detailed description.

Figure 3:
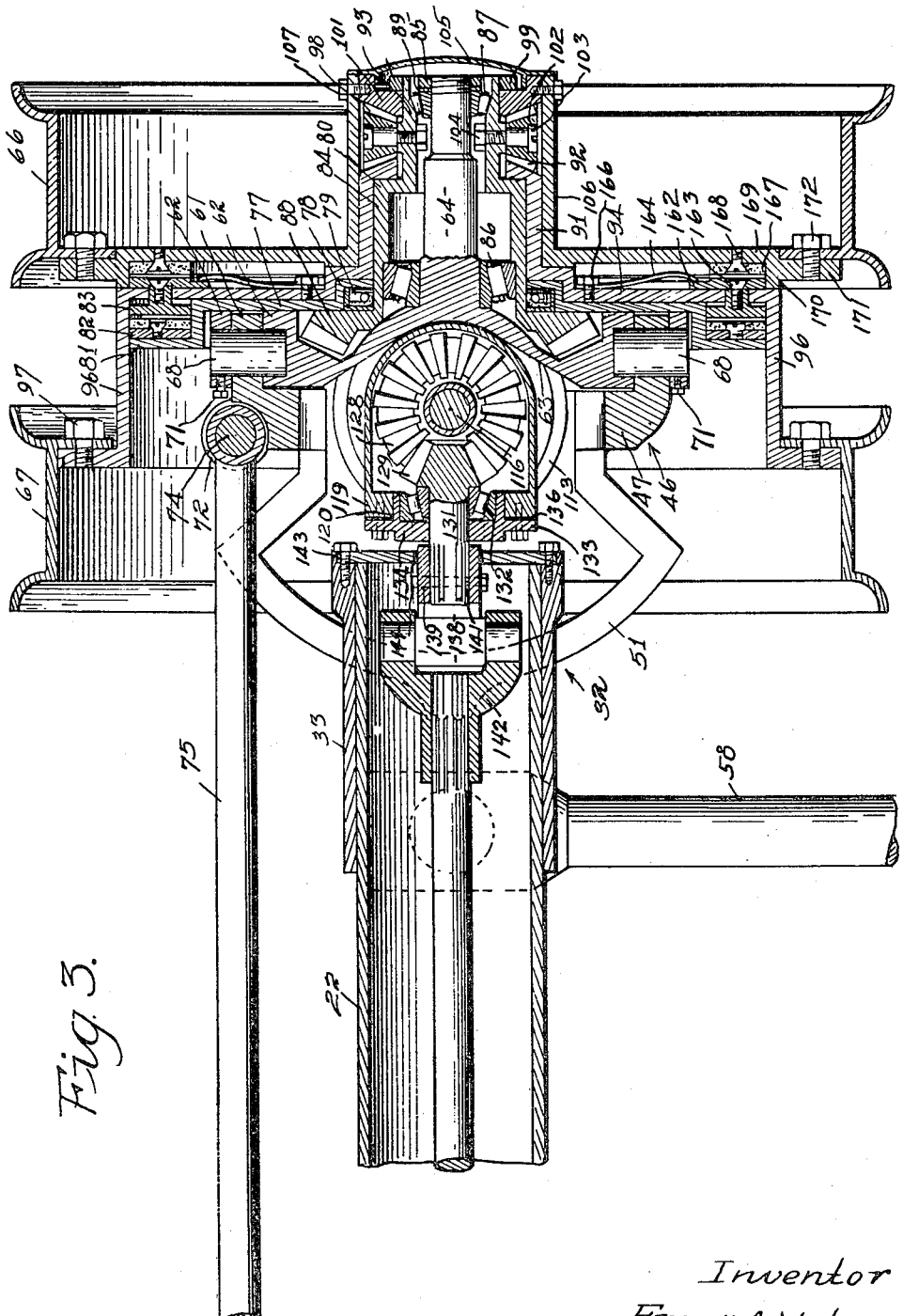
Fig. 3 is a sectional view taken along the line 3—3 in Fig. 2.
Figure 4:
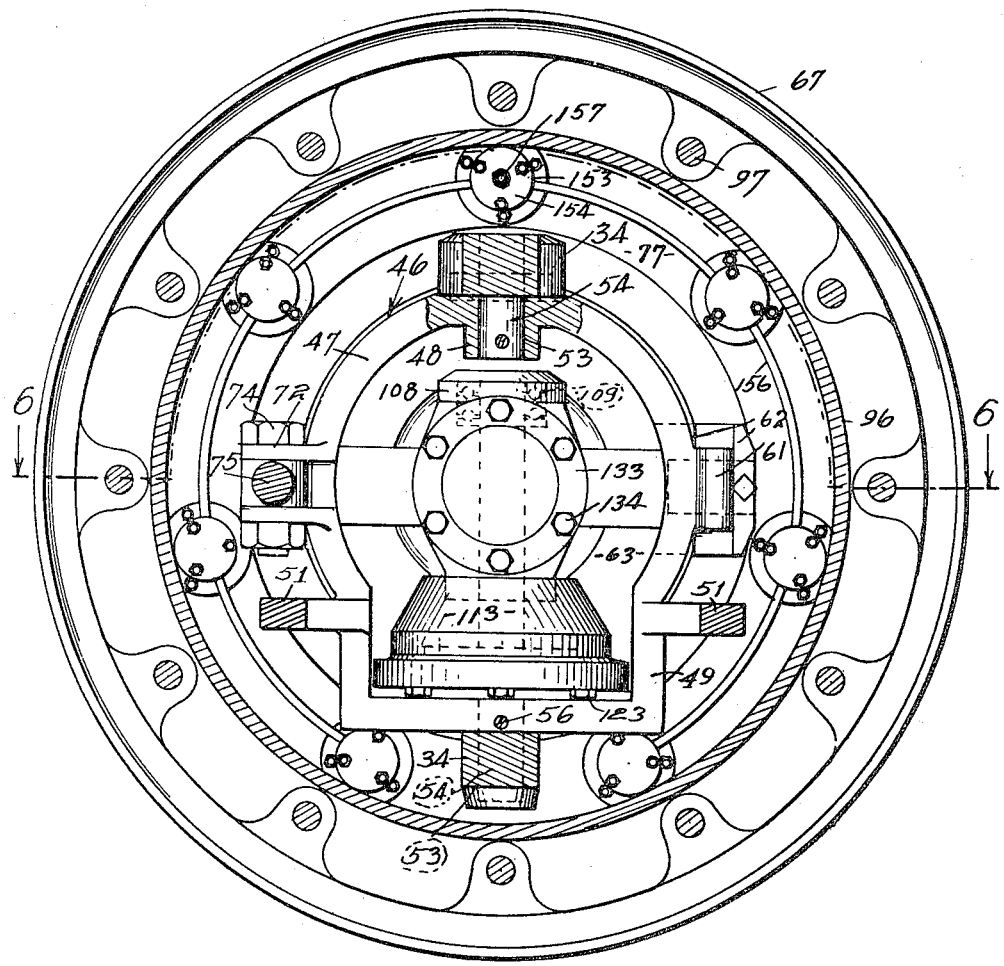
Fig. 4 is a view partly in section as seen along the line 4—4 in Fig. 2.

A front wheel assembly includes the steering head 32, previously explained, and a steering frame or yoke member 46 (Figs. 2, 3 and 8). The yoke member 46 is integrally formed with a vertically extending portion 47 of a substantially ring shape having a top boss portion 48 and a U-shaped bottom 49, and a horizontally projected quadrant 51 with a steering knuckle 52. The boss portion 48 and U-shaped bottom 49 have coaxially aligned bores 53, with the vertical height of the steering frame being such that it slidably fits between the jaws 34 of the steering head 32. When the steering frame is in position within the jaws 34 a bore 53 in the steering frame is adjacent a corresponding jaw 34 in the steering head with all of the bores 35 and 53 being in coaxial alignment. This relative position of the steering head 32 and the steering frame 46 is maintained by the insertion of a king pin 54 in each pair of corresponding bores 35 and 53, a bushing or bearing 56 being located in a bore 35 to rotatably support a king pin 54.

The king pins 54 are secured for pivotal movement with the steering frame 46 by an associated tapered pin 55 extended through aligned openings formed in a king pin and in the steering frame 46 through the wall of each bore 53. It is seen, therefore, that on manipulation of the steering knuckle 52 the steering frame 46 is pivotally moved about the king pins 54 in a horizontal plane. Actuation of the steering knuckle 52 is accomplished by its connection in a ball and socket joint 57 (Figs. 1 and 2) with a steering rod 58 suitably connected with a steering wheel 59 for the vehicle.

As best shown in Figs. 3 and 8 the steering frame 46 at the ring portion 47 is provided with a pair of ears 61 oppositely extended in the same axial direction and in a horizontal plane. An ear 61 is constructed for reception between the legs of a corresponding U-shaped lug 62 oppositely arranged on a gear case 63 integrally formed with a spindle 64 for dual wheels 66 and 67. The legs of each lug 62 have aligned holes therethrough for receiving a pivot pin or stub shaft 68 which is also extended through a hole in a corresponding ear 61 on the steering frame 46. The extreme end of each ear 61 is extended through an opening provided in the connecting portion 69 between the legs of a lug 62.

Each pivot pin 68 is maintained in position within a corresponding ear 61 and lug 62 by a setscrew 71 threaded in a lug 62 for frictional engagement with a pin 68. It is thus seen that the combination gear case and spindle 63—64 is supported at the pivot pins 68 for pivotal movement with the steering frame 46 in a horizontal plane, and for pivotal movement about the pins 68 in a vertical plane independently of the steering frame 46.

This double pivotal movement of the combination gear case and spindle 63—64 is clearly apparent from a consideration of Fig. 8. As previously explained the steering head 32 is fixed on the front axle housing 22 with the horizontal jaws 34 in a vertically spaced relation. On insertion of the steering frame 46 between the jaws 34 the upper boss portion 48 and lower portion 49 of the steering frame are adjacent to a corresponding jaw 34. On extension of the pins 54 within the aligned openings 35 and 53 in these adjacent corresponding parts, the steering frame is rotatably supported on the steering head 32 for pivotal movement in a horizontal plane about the vertically extended pins 54. With the steering head 32 and steering frame 46 assembled in this manner the gear case 62 of the combination gear case and spindle 63—64 is pivotally connected with the steering frame by the coacting engagement of a corresponding ear 61 and lug 62 and the insertion of a pin 68 therethrough. By virtue of the pin 68 being extended in a horizontal plane the combination gear case 63 and spindle 64 is pivotally movable in a horizontal plane with the steering frame 46 relative to the steering head 32, but movable in a vertical plane independently of the steering frame 46 and regardless of the pivotal position of the steering frame 46 relative to the steering head 32. In other words, this relative assembly and construction of the steering head 32, steering frame 46 and combination gear case and spindle member 63—64 provides for a concurrent pivotal movement of the combination member in both vertical and horizontal planes.

As shown in Fig. 8 the ring portion 47 of the steering frame 46 is formed at one side with a pair of vertically spaced lugs 72 extended in a direction oppositely from one of the lugs 61. The lugs 72 are formed with aligned openings 73 for receiving a pin 74 by which a drag link 75 is povotally connected at one end with the steering frame 46. The opposite end of the drag link 75 is connected with like lugs 72 formed on a steering frame for the opposite dual wheel assembly corresponding to the wheels 66 and 67. The steering frame 46 for this opposite dual wheel assembly is constructed in all respects the same as the steering frame 46 except for the elimination of the quadrant 51 and steering knuckle 52 for reasons which are believed to be obvious.

Secured by screws 76 to the back or right side of the gear case 63, as viewed in Fig. 2, is a combination gear case cover and brake backing plate 77. The plate 77 has an offset portion 78 at its inner periphery to accommodate a grease retainer ring 79 and an offset portion 81 at its outer periphery to receive brake rings 82 and 83 which will be later described. The retainer ring 79 is mounted about a stepped hub or sleeve unit 84 rotatably supported on the spindle 64 by roller bearings 86 and 87. Integrally formed with the sleeve unit 84 and at the extreme left end thereof as viewed in Fig. 2, is a gear ring 88 which is located between the back of the gear case 63 and the backing plate 77. The sleeve is maintained in an axial position on the spindle 64 by a hexagonal nut 85 threaded on the end of the spindle and locked in a usual manner by a coacting washer 89.

A stepped hub 91 for the inner wheel 67 is rotatably supported over an enlarged section of the sleeve unit 84, with the hub 91 terminating at one end in an integrally formed gear ring 92 rotatable about a reduced section 93 of the sleeve 84. The gear 92 is held in position axially of the sleeve by the coacting engagement of mating sleeve and hub portions which form a shoulder 80 at the junction of the enlarged part of the sleeve with its reduced section 93. The opposite end of the hub 91 is offset for mating engagement with the offset 78 in the backing plate 77. Integral with the hub at such opposite end is a wheel plate 94 for the wheel 67 having an axially extending annular flange 96 at its outer periphery constructed for connection with the wheel rim by bolts 97.

Also rotatable on the reduced section 93 of the sleeve 84, and at the end of the sleeve in an axially spaced relation with the gear ring 92, is a gear ring 98. The gear ring 98 is assembled on the sleeve 84 at the outer or free end of the spindle 64 and is held against axial movement on the sleeve in one direction by a locking nut and washer assembly 99. Axial movement of the gear 98 in an opposite direction is prevented by a circumferential shoulder portion 101 formed on the reduced section 93 of the sleeve 84 between the gear 98 and the gear 92. On the shoulder section 101 are mounted differential gears 102 rotatably supported on screws 103 radially extended from the sleeve 84 and secured thereto by an associated nut 104. The gears 102 coact with the ring gears 92 and 98 in the conventional differential gearing manner.

The hub 106 for the outer wheel 66 is rotatably supported on the hub 91 for the inner wheel 67 and extends over the gears 102 to completely enclose these gears within the wheel assembly and between the gears 92 and 98. The hub 106 is secured to the gear 98 by screws 107 so as to be rotatable therewith. A spring cover 105 is received within the blank side of the gear 98 to cover the outer end of the wheel spindle 64 and the associated assembled parts. Thus considering the sleeve 84 as a driven unit the relative assembly of the gears 92, 98 and 102 provides a differential mechanism between the wheels 66 and 67 which is carried on the spindle 64 and completely enclosed within the dual wheel assembly.

The gear mechanism for driving the gear ring 88 on the sleeve 84 from the drive shaft 31 will now be described. The gear case 63 adjacent its upper end, as viewed in Figs. 2 and 8, is provided with an inverted cup-shaped projection 108 for receiving a bearing 109. Oppositely arranged vertically downwardly from the cup-shaped projection 108 is an opening 111 for a bearing 112, the opening 111 being formed in a horizontally and downwardly extended cap 113 integral with the gear case 63. The cap 113 is open at the back side of the gear case 63 and constitutes a part of the housing for a gear 114 mounted on a vertical shaft 116 and in meshing engagement with the sleeve gear 88. The shaft 116 is of a stepped construction and rotatable in the bearings 109 and 112, bearings 117 and 118 oppositely positioned in a gear case insert 119, and a bearing 121 adjacent the lower end of the shaft 116, as viewed in Fig. 2, carried in a cover plate 122 for the bottom of the cap 113. The lower bearing 121 is held in vertical coaxial alignment with the remaining supporting bearings for the shaft 116 by a fitted positioning of the cover plate 122 within the cap and against the backing plate 77, and the securing of the plate 122 to the cap by screws 123. Thus as shown in Fig. 2 the gears 88 and 114 are completely enclosed between the back of the gear case 63, the cover plate 122 and the backing plate 77.

Figure 7:
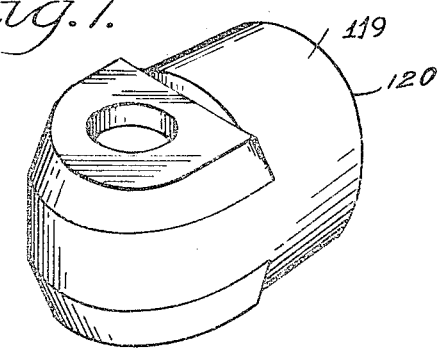
Fig. 7 is a perspective view of a part of the front wheel drive assembly.

The gear case insert 119 (Figs. 2, 3 and 7) is of a substantially cylindrical shape having a closed rounded end and an opposite open end 120, with the opposite sides of the insert in which the bearings 117 and 118 are located being of a flat form to provide for the assembly of these bearings in frictional engagement with the corresponding bearings 108 and 111 in the gear case 63. Mounted on the vertical shaft 116 and within the gear case insert 119 is a gear 128 frictionally engageable with the bearing 118 and in meshing engagement with a gear 129 mounted on a stub shaft 131 which is extended from the axle housing 22 and into the gear case insert 119 at its open end 120 (Figs. 2 and 3). The relative assembly and construction of the ear lugs 62 of the gear case and the gear case insert 119 is such that when the gear case 63 is pivotally connected at the pins 68 with the steering frame 46, the shaft 116 is in vertical coaxial alignment with the pivot pins 54 connecting the steering frame with the steering head 32.

The drive shaft gear 129 (Fig. 3) is mounted on a stub shaft 131 journaled on a roller bearing 132 carried in a cover plate 133 for the open end 120 of the insert 119, the cover 133 being secured to the insert by screws 134. Adjustment of the bearing 132 relative to the gear 129 is accomplished by the insertion of shims 136 between the cover 133 and the insert end 120.

Connection of the drive shaft 31 with the stub shaft 131 is made through a universal joint 138 having one hub 139 splined with the stub shaft, with the relative axial positions of the stub shaft 131 and hub 139 being maintained by a tapered pin 141 extended therethrough. The opposite hub 142 of the universal joint is in splined engagement with the drive shaft 31 but axially slidable relative to the shaft 31. A plate member 143 is secured over the outer or free end of the axle housing 22 and is provided with a vertically extended opening 144. The hub 139 of the universal joint 138 is in bearing engagement with the vertical sides of the opening 144, as shown in Fig. 3, but is free to oscillate in a vertical direction between the ends of the opening 144 as shown in Fig. 2. The gear 129 is thus pivotally movable in a vertical plane with the gear case 63 and gear case insert 119, while the stub shaft 131 is maintained in axial alignment with the drive shaft 31.

In the operation of the dual front wheel drive assembly oscillation or turning movement of the steering frame 46 in a horizontal plane by operation of the vehicle steering wheel 59 moves the combination gear case and spindle member 63—64 and all of the mechanism attached thereto as a unit. During such oscillation or turning movement the gear 128 rolls relative to the gear 129a and the gear 114 relative to the gear 88, by virtue of the shaft 116 being in coaxial alignment with the pivot pins 54.

Further the different relative distances travelled by the wheels 66 and 67 during a turning movement is accomplished without any scuffing or dragging of the wheel tires because of the differential gears 92, 98 and 102. This same differential action takes place when the wheels 66 and 67 are travelling over road surfaces of different elevation such as the usual crowned road illustrated in Fig. 5. The differential mechanism while permitting either of the wheels to overrun the other also provides for the application of an equal driving force to each wheel.

The assembly of the steering head 32 within the inner wheel 67 with the jaws 34 extended substantially to the outer wheel 66 places the pivot pins 54 in a vertical plane adjacent the vertical plane of the pivot pins 68 which are located centrally between the wheels 66 and 67. This arrangement of the pivot pins 54 and 68, together with a relatively wide vertical spacing of the jaws 34, eliminates the bending moment on the drive shaft 31, stub shaft 131 and spindle 64, and further reduces the frictional pressure at the pivot pins 54.

The central position of the pivot pins 54 and 68 between the dual wheels effectively balances the pivoting torque of the wheels and further divides and balances the shocks resulting when the wheels meet with any road obstruction. This effectively reduces shimmy in the wheels which is one of the major faults of dual steering wheels. Further by this construction I am able to obtain 45° pivoting angles as compared with 37° angularity in conventional axles. The pivoting action of my dual steering wheels, which are also drivers, eliminates the tire drag of fixed wheels which is known to reduce the life one-half in mountainous roads having almost continuous twists and turns.

From a consideration of Figs. 2 and 3 it is seen that the pivot pins 68 are centrally located between the wheel tires so that the load on the vehicle is equally supported on the tires.

Since the wheels 66 and 67 are free to pivot on the pivot pins 68 to automatically conform to changing road surfaces, as shown for a crowned road in Fig. 5, an even support of the vehicle load on the wheel tires is maintained at all times of vehicle travel. This pivotal action of the wheels also provides for a reduction in the impact on a tire resulting from the striking of a road object since the tire is able to ride over the object without having to lift the companion tire an equal height out of contact with the road.

The brake system for the wheels 66 and 67 includes the brake rings 82 and 83, previously mentioned, which are located in the outer peripheral offset 81 of the backing plate 77 (Fig. 2). The ring 82 is integrally formed with a plurality of angularly spaced studs or extensions 149 projected axially from one side of the ring into corresponding openings formed in the radially extended part of the offset 81. Secured to the opposite side of the brake ring 82 is an annular brake shoe 151. The extensions 149 are slidably supported for axial movement in the offset 81.

A disc-like piston 152 is carried at the free or outer end of each extension 149 for cooperative association with a corresponding pressure cylinder 153 concentrically arranged relative to an extension 149 and secured at its lower end to the outside of the offset 81, the extension 149 acting as a piston rod for the piston 152. The top of the cylinder is closed by a cover plate 154, with a space in each cylinder and piston assembly formed between the piston 152 and a corresponding cylinder cover 154 being interconnected by pipe lines 156 connected to a main line 157, which in turn is connected with a master fluid cylinder (not shown) of a fluid braking system which includes the brake pedal 158 shown in Fig. 1.

On operation of the brake pedal 158 the fluid pressure in the lines 156 and 157 and in the cylinders 153 is increased by the action of the master cylinder, in a manner well known in the art, to in turn move the pistons 152 and brake ring 82 in an axial direction toward the right, as viewed in Fig. 2, for a purpose which will appear later. This movement of the pistons 152 and brake ring 82 takes place against the action of a spring 160 arranged in compression between each piston 152 and the bottom of an associated cylinder 153.

The brake ring 83, which is assembled within the offset 81 with the brake ring 82, has a flat side adjacent the brake band 151 of the brake ring 82. The opposite side of the brake ring 83 is integrally formed with a plurality of angularly spaced lugs 159 which are slidably movable in an axial direction through corresponding openings in the flange or wheel plate 94 of the inner wheel 67. From a consideration of Fig. 2 it is seen that the brake rings 82 and 83, with the brake band 151 therebetween are completely enclosed by the offset 81 and cooperating portions of the wheel plate 94 and its axial annular flange 96, the wheel plate 94 being in back to back slidable engagement with the backing plate 77. The brake ring 83 is connected at the lugs 159 to a brake ring 162 by screws 163, the brake ring 162 being adjacent the side of the wheel plate 94 opposite from the wheel plate side which is adjacent to the brake ring 83. The lugs 159 are of a length relative to the width of the wheel plate 94 such that the brake rings 83 and 162 are axially movable to stop positions against a corresponding side of the wheel plate 94.

Normally the brake ring 162 is releasably held in a stop position and the brake ring 82 out of a stop position with the wheel plate 94 by a plurality of flat springs 164 each of which has one end biasing the brake ring 162 toward the wheel plate 94 and an opposite end secured to the wheel plate 194 by a cap screw 166. The brake rings 83 and 162 are rotatable with the wheel plate 94 and in turn with the inner wheel 67.

A brake shoe ring 167 is secured by screws 168 to the wheel plate 169 of the outer wheel 66, which wheel plate is integral with the outer wheel hub 106. The wheel plate 169 at its outer periphery has an axially extended annular flange 170 positioned about the brake ring 162 and brake shoe 167, the flange terminating adjacent the inner wheel plate 94 so that the brake ring 162 and brake shoe 167 are completely enclosed between the inner wheel plate 94 and the outer wheel plate 169, with the brake shoe 167 rotatable with the wheel plate 169. Radially extended from the flange 170 is an annular flange 171 to which the rim of the outer wheel 66 is connected by bolts 172.

In a normal released position of the above described brake rings 82, 83 and 162 and the brake shoes 151 and 167, the brake shoe 151 is releasably held out of a frictionally engaging position with the brake ring 83 by the springs 160 in the pressure cylinders 153, while the brake ring 162 is releasably held out of a frictional engaging position with the brake shoe 167 by the springs 164. On operation of the master cylinder by the brake pedal 158 to supply fluid under pressure to the cylinders 153 the brake shoe 151 engages and moves the brake ring 162 against the brake shoe 167. Both the brake ring 83 and brake shoe 151 are in frictional engagement, prior to the engagement of the brake ring 162 and brake shoe 167, but this initial engagement is very slight and without any apparent braking effect on the inner wheel 67. After the brake ring 162 and brake shoe 167 are frictionally engaged both wheels 66 and 67 are concurrently braked, the inner wheel 67 by the frictional engagement of the rotating ring 83 with the stationary brake shoe 151 and the outer wheel by the frictional engagement of the brake ring 162 with the brake shoe 167.

Because of the connection of the pressure cylinders 153 with a common master cylinder a substantially equal pressure is applied over all parts of the brake ring 82 and in turn over the brake shoe 167. Separate frictional braking is thus effectively applied to each of the wheels 66 and 67 over relatively large braking surfaces, with the braking action being substantially simultaneous. On release of the brake pedal 158 the brakes on both wheels are released together by the concurrent reduction of the pressure in the cylinders 153 and the action of the springs 160 and 164. As a result, during a complete brake action the full braking torque is always divided between the wheels 66 and 67.

From a consideration of the above description it is seen that the invention provides an automotive vehicle of heavy duty type, in which the load is capable of being equally distributed over all of the vehicle tires by the provision of an improved front dual wheel assembly. Although the wheels in this assembly are relatively rotatable their positive braking is accomplished by individual brakes relatively assembled so as to be completely enclosed within the wheel assembly and concurrently operated from a common master cylinder. The differential mechanism providing for a relative rotation between the front dual wheels is also enclosed within the wheel assembly and supported entirely on the wheel spindle, to provide in all a compact wheel assembly adapted to be positioned within the same space available for dual wheel assemblies now used commercially.

The wheel driving mechanism is completely free of the pins 54 and 68 so that any wear on these pins in no way changes the relationship of the related parts of the driving mechanism. Conversely the pins 54 and 68 are not affected in any manner by wear or adjustments to the driving mechanism. The driving mechanism and brake system are completely enclosed within the confines of the wheels 66 and 67 so as to be protected against possible injury by striking obstructions, loading docks and the like. Also the wide spacing or vertical distance between the pivot pins 54, together with the location of the pivot pins 68, intermediate the wheels 66 and 67 permits the wheels to absorb heavy shocks without displacement or injury to these pins and the parts which they connect.

Although the invention has been described with respect to a preferred embodiment thereof it is to be understood that it is not to be so limited since modifications and changes can be made therein which are within the full intended scope of this invention as defined by the appended claims.

I claim:

1. A dual front wheel drive assembly including an axle housing, a drive shaft, a yoke member, a spindle for rotatably supporting dual wheels, pivotal means for supporting said yoke member on said axle housing for pivotal movement in a horizontal plane, means for supporting said spindle on said yoke member for pivotal movement in a vertical plane, and means operatively connecting said wheels with said drive shaft.

2. A dual front wheel drive assembly including an axle housing, a drive shaft, a yoke member, a spindle for rotatably supporting dual wheels, pivotal means for supporting said yoke member on said axle housing for pivotal movement in a horizontal plane, second pivotal means supporting said spindle on said yoke member for pivotal movement in a vertical plane, with said second pivotal means being in the plane of said spindle and located substantially intermediate said dual wheels, and means operatively connecting said wheels in a driven relation with said drive shaft.

3. A dual front wheel drive assembly including an axle portion, a drive shaft, a frame member, means pivotally supporting said frame member on said axle for movement about a vertical axis, a spindle for rotatably supporting dual wheels, means pivotally supporting said spindle on said frame member for pivotal movement about a horizontal axis, and means operatively connecting said drive shaft with said dual wheels including a differential mechanism carried on said spindle.

4. A dual front wheel drive assembly including an axle housing, a drive shaft, a yoke member, pivotal means for supporting said yoke member on said axle housing for pivotal movement in a horizontal plane, a spindle for rotatably supporting dual wheels, a second pivotal means for supporting said spindle on said yoke member for pivotal movement in a vertical plane, with said first pivotal means being located substantially intermediate said dual wheels, and means connecting said drive shaft with said dual wheels including a differential mechanism carried on said spindle.

5. A dual front wheel drive assembly including an axle housing, a drive shaft, a yoke member, a spindle for rotatably supporting dual wheels, supporting means including pivotal means for supporting said yoke member on said axle housing for pivotal movement in a horizontal plane, second pivotal means supporting said spindle on said yoke member for pivotal movement in a vertical plane, with said two pivotal means being located substantially between said dual wheels, and means operatively connecting said dual wheels with said drive shaft including a differential mechanism carried on said spindle.

6. A dual front wheel drive assembly including an axle housing, a driving shaft, a frame member, means supporting said frame member on said axle housing for pivotal movement about a vertical axis, a spindle for dual wheels, means supporting said spindle on said frame member for pivotal movement about a horizontal axis, and a gear unit pivotally movable with said spindle including a driven shaft having the axis thereof in alignment with said vertical axis, means connecting said driven shaft with said drive shaft, and a differential mechanism operatively connecting said gear unit with said wheels.

7. A dual front wheel drive assembly including an axle housing, a supporting member on said axle housing having a pair of vertically spaced portions, pivotal means in each of said vertically spaced portions, a yoke supported on said two pivotal means for pivotal movement in a horizontal plane, a spindle having a dual wheel carrying portion and a supporting portion, means pivotally connecting said supporting portion with said yoke for pivotal movement of said spindle in a vertical plane, a driven shaft rotatably mounted on said spindle supporting portion in vertical alignment with said pivotal means, a gear on said driven shaft, a gear on said drive shaft in meshing engagement with said driven shaft gear, and means operatively connecting the dual wheels with said driven shaft gear.

8. A dual front wheel drive assembly including an axle housing, a drive shaft, a yoke member pivotally supported from said axle housing for movement about a vertical axis, a spindle having a supporting portion for dual wheels and a portion rotatably supported on said yoke member to provide for a pivotal movement of the spindle about a horizontal axis, means operatively connecting said dual wheels with said drive shaft including a differential mechanism having a driven sleeve member rotatably carried on said spindle wheel supporting portion, a plurality of rotatable gears angularly spaced about said sleeve member, a hub for one of said dual wheels having a gear portion rotatable on said sleeve member, and a hub for the other of said dual wheels having a gear portion rotatable on said sleeve member, with said plurality of rotatable gears being located between said two gear portions and in meshing engagement therewith.

9. A dual front wheel drive assembly including an axle housing, a drive shaft, a yoke member, pivotal means supporting said yoke member from said axle housing for pivotal movement in a horizontal plane, a spindle for rotatably supporting dual wheels having a gear housing at one end thereof, a second pivotal means pivotally connecting said housing with said yoke member to provide for pivotal movement of said spindle in a vertical plane, a drive shaft in said housing in co-axial alignment with said first pivotal means, gear means mounted on said shaft, a sleeve member rotatably supported on said spindle having a gear portion thereon, with said drive shaft and gear portion being operatively connected with said gear means, and means connecting said dual wheels for driving by said sleeve member including a differential mechanism carried on said spindle.

FRANK A. WATSON.